United States Patent [19]

Adams

[11] 4,101,369

[45] Jul. 18, 1978

[54] BOTTOM SEAL CUT-OFF

[75] Inventor: Richard C. Adams, West Barrington, R.I.

[73] Assignee: G. T. Schjeldahl Company, Northfield, Minn.

[21] Appl. No.: 240,075

[22] Filed: Mar. 31, 1972

[51] Int. Cl.[2] .......................... B32B 31/00; B30B 15/34

[52] U.S. Cl. .......................................... 156/510; 156/583

[58] Field of Search ................ 156/510, 515, 583, 251

[56] References Cited

U.S. PATENT DOCUMENTS

| | | | |
|---|---|---|---|
| 3,053,723 | 9/1962 | Plach et al. | 156/515 |
| 3,060,075 | 10/1962 | Kincaid | 156/510 |
| 3,257,256 | 6/1966 | Lehmacher et al. | 156/515 |
| 3,663,338 | 5/1972 | Wech | 156/515 |

*Primary Examiner*—Douglas J. Drummond
*Attorney, Agent, or Firm*—Orrin M. Haugen

[57] ABSTRACT

Thermoplastic web treating apparatus, particularly adapted for the fabrication of flexible bags and comprising, in combination, a web treating station along with means for intermittently advancing webs through the station. The treating station includes thermal welding or sealing apparatus with a welding bar and sealing pad combination for forming spaced seals in the web, and a cutting blade for cutting or shearing the web. The apparatus is designed to provide tension during cutting operations, and to eliminate tension prior to and during sealing operations to permit "relaxation" of the film prior to formation of the seal, as well as to break away any bond which may form between the thermoplastic web and the sealing pad from the sealing operation. This break-away of the bond is accomplished through an initial short duration reversal of the web draw rolls prior to each web advance.

2 Claims, 7 Drawing Figures

BOTTOM SEAL CUT-OFF

CROSS-REFERENCE TO RELATED APPLICATIONS

The present invention utilizes certain of the features set forth in co-pending application Ser. No. 151,842, filed June 10, 1971 and entitled "INTERMITTENT DRIVE MECHANISM", now U.S. Pat. No. 3,776,804, and co-pending application Ser. No. 207,841, filed Dec. 14, 1971, entitled "INTERMITTENT DRIVE MECHANISM", now abandoned both of which are assigned to the same assignee as the present invention.

BACKGROUND OF THE INVENTION

The present invention relates generally to apparatus for intermittently advancing a web of flexible film, and for treating the web in a treating station, the treating station including a welding bar and sealing pad for forming seals in the web structure, along with a cutting blade for severing the web where desired. The drive means is arranged to impart repeating cycles of intermittent motion and dwell to the web, with the drive means being operated in synchronism with the welding or sealing apparatus. Means are provided to place the web under tension during the cutting operation, along with means to eliminate tension prior to and during the sealing operation to permit relaxation of the film prior to formation of the seal. Also, the draw rolls which are utilized in the web advancing mechanism are arranged to move through an initial short duration reversal prior to each web advance in order to break away any bond which may occur between the thermoplastic web and the sealing pad.

The apparatus of the present invention is particularly adapted for the preparation of bottom-seal bags which are formed from tubular webs of thermoplastic material, with the completed bag structure having a thermally welded bottom seal, along with an open top. The apparatus of the present invention controls the motion of the web through the working station, and controls this motion in such a way so as to relax the film prior to sealing and to break away any bond which may form between the web and the sealing pad.

In the past, various techniques have been proposed for bottom seal bag-making machines, these machines utilizing, for the most part, means for advancing the webs, along with welding or sealing means and cutting blades. In order to perform welding or sealing operations along with cutting operations, various precautions had to be taken in order to properly prepare the web for the specific operations to be employed. In order to form a uniform straight cut in the web, it is necessary that the web be under tension, and that the tension be maintained during the cutting operation. On the other hand, the sealing operation requires the web to be in a slack condition, preferably relaxed, since the welding or sealing operation softens the body of the thermoplastic material sufficiently to permit rupture to occur if any tension is applied during sealing. Furthermore, in order to preserve the condition of the seal subsequent to its formation, it is essential that means be provided to cool the sealed area prior to the time that any attempts are made to move the web. Unfortunately, when the sealed area was permitted to remain in contact with the sealing pad during cooling, the seal or sealed zone would occasionally form a bond with the surface of the sealing pad, and unless precautions are taken to release this film bond prior to movement of the web, jamming could occur.

The present invention obviates these problem areas by maintaining the web under tension prior to and during the cutting operation, permitting the web to relax prior to sealing and maintaining the web in a slack condition for the sealing operation, the sealing operation being performed subsequent to the cutting and relaxation operation. Thereafter, the seal is permitted to cool and positive web motion occurs in order to release the web from the surface of the sealing pad.

SUMMARY OF THE INVENTION

Briefly, in accordance with the present invention, a bag-making apparatus is provided which includes web advancing means, web cutting means, and web sealing means. The web advancing means is arranged to intermittently provide cycles of motion and dwell to the web, with the initial motion of the web following sealing being delayed to permit effective "setting" of the sealed area prior to imparting motion to the web. Furthermore, the initial direction of motion for the web following sealing is in the reverse direction, the reverse motion continuing only briefly and for a short distance in order to insure the breaking of any bond which may have been formed between the sealed web and the sealing pad. Thereafter, web motion is in the forward web direction.

The timing for the apparatus is arranged such that the draw cycle occurs during approximately 50% of the machine cycle, with a period of dwell taking the remaining time. The film is actively treated during the dwell time with the initial treatment being cutting, the cutting being followed by a finite period of time to permit web relaxation, and then by a sealing operation. A period of dwell is provided to permit cooling or "setting" of the sealed area. Upon initiation of the draw cycle, the draw rolls are arranged to move in the reverse direction, thus assuring a break in any bond which may be established between the sealed film and the sealing pad, the draw rolls thereafter rotating in the forward direction so as to advance the web for the next sealing and cutting operation.

Therefore, it is a primary object of the present invention to provide an improved thermoplastic web treating apparatus which is particularly adapted for the fabrication of bottom seal bag structures, and wherein the quality of the bottom seal is improved so as to provide consistent seals with a high degree of uniformity and integrity.

It is a further object of the present invention to provide an improved thermoplastic web treating apparatus which is designed to fabricate bottom seal bags, wherein these bags have uniform cuts and seals formed therein, thus enhancing the consistency of the prepared product.

It is still a further object of the present invention to provide an improved apparatus for the preparation of bottom-seal bags, and wherein the apparatus is arranged to impart motion to the web so as to assure relaxation of the web prior to sealing and release of the web from the sealing pad following each seal formation and seal cooling of setting event.

It is still a further object of the present invention to provide an improved apparatus for the preparation of bottom-seal bags wherein the thermoplastic web utilized is initially cut and thereafter sealed, with the cut occurring during a period when the web is under tension, and with the seal being formed when the web is slack.

Other and further objects of the present invention will become apparent to those skilled in the art upon a study of the following specification, appended claims, and accompanying drawings.

DESCRIPTION OF THE PREFERRED EMBODIMENT

Figure 1:
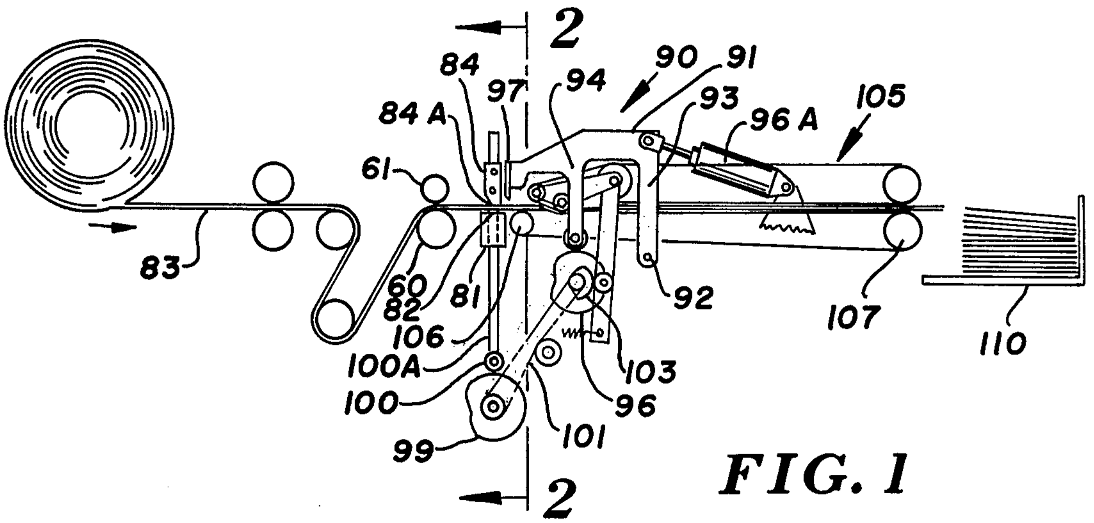
FIG. 1 is a side elevational view of a portion only of the apparatus utilized in the present invention, and illustrating the web and the pertinent components of the web treating apparatus.
Figure 4:
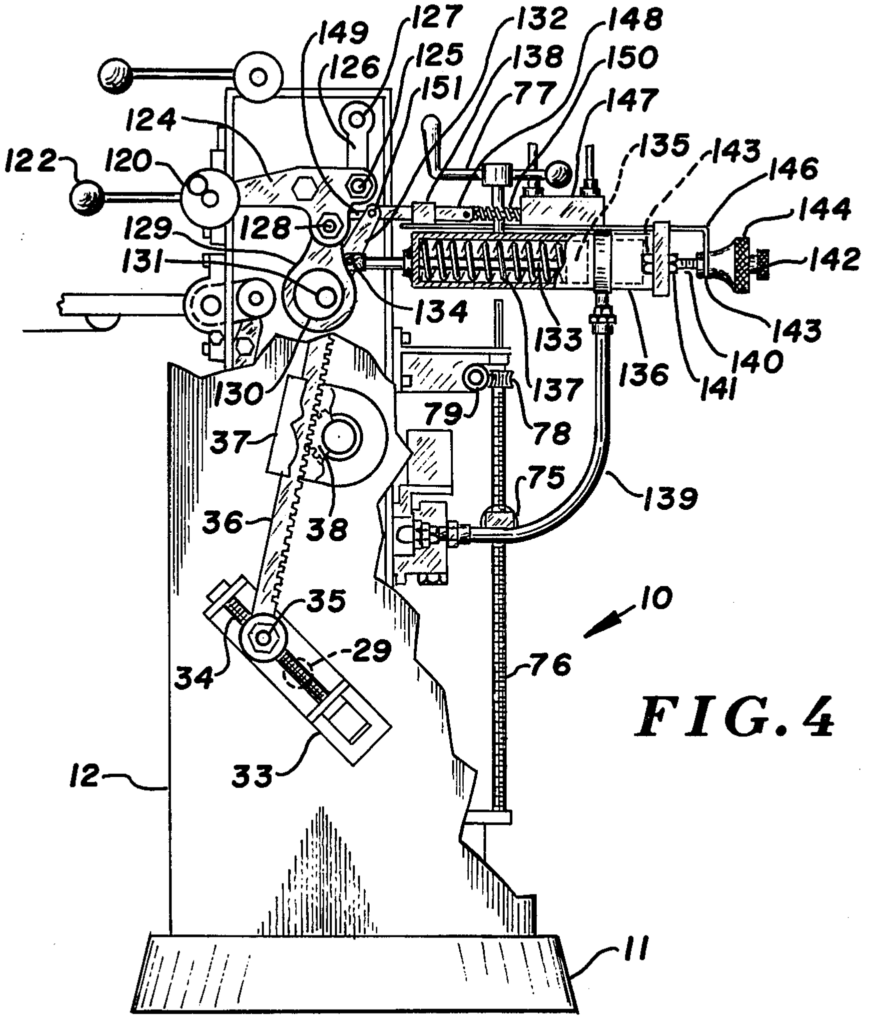
FIG. 4 is a side elevational view, partially broken away, of the rack and pinion drive means employed in the present invention.
Figure 2:
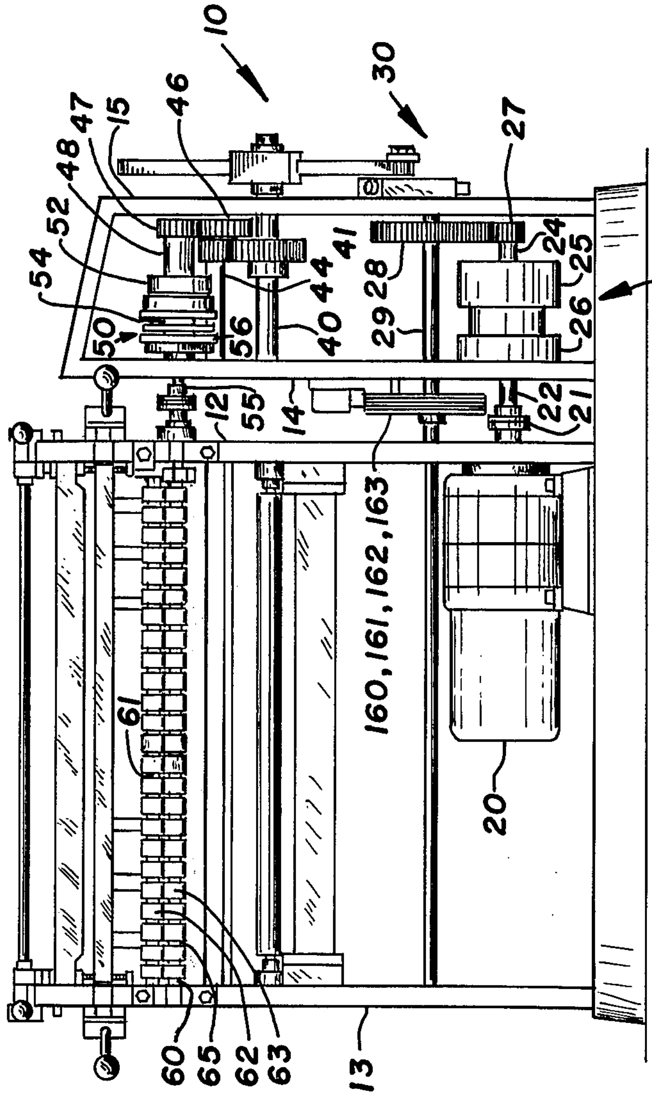
FIG. 2 is an end elevational view of the web drive portion of the structure, and taken along the lines 2—2 of FIG. 1.

In accordance with the preferred modification of the present invention, and with particular attention being directed to FIGS. 1, 2 and 4 of the drawings, the bag-making apparatus generally designated 10 is provided with a frame structure including a base 11 and upright frame members 12, 13, 14 and 15. Details of the bag-making machine utilizing a conventional drive and other structure are set forth in U.S. Pat. No. 2,947,345, and are hereby incorporated with reference into this specification. The apparatus disclosed in U.S. Pat. No. 2,947,345 is arranged for the production of side-welded bag structures or styles, and the present apparatus differs from that disclosed in U.S. Pat. No. 2,947,345 only insofar as there is provided but a single rack and pinion drive, and further in the arrangement of the welding or seal bar, the details of which will be disclosed and described in detail hereinbelow. A drive motor 20 is mounted on the base member 11 by conventional attaching means, the shaft of motor 20 being coupled as at 21 to drive shaft 22, shaft 22 being coupled to the input of a conventional clutch-brake assembly generally designated 23. Shaft 24 rotates with shaft 22 through clutch portion 25, or is idle when the clutch-brake assembly 23 is stopped against its brake portion 26. Drive gear 27 is fast upon shaft 24 and is in mesh with gear 28, which, in turn, is fast upon the end of input shaft 29. It will be observed that input shaft 29 extends across the entire width of the apparatus, and is appropriately journaled for rotation with suitable bearings in each of the uprights 12, 13, 14 and 15.

At one end of input shaft 29, a driver unit generally designated 30 is arranged, this driver unit being of the rack and pinion type. With particular attention being directed to FIG. 4 of the drawings, a crank element is secured to the end of shaft 29, such as crank element 33, this element comprising a component part of driver 30. Crank 33 is provided with a screw adjustment such as the screw adjustment column 34 for radially adjusting the respective crank pin, such as the pin 35 at a desired radial distance from the axis of shaft 29. A gear rack 36 is pivotally secured to pin 35, this element further comprising a portion of driver 30. A rack guide 37 is provided to receive rack 36, with pinion 38 being arranged in mesh with the teeth of rack 36, as illustrated in detail in FIG. 4. It will be appreciated that pinion 38 is alternately driven in one direction and then in the other during the rotation of input shaft 29 and crank 33. Pinion 38 is secured fast onto shaft 40, this shaft being provided with gearing as at 41, gear 41 being fast on shaft 40. Gear 41 drives pinion 42 secured to shaft 44, shaft 44 being journaled in parallel relationship to shaft 40, in uprights 14 and 15. Also secured to shaft 44 is gear 46, which, in turn, drives gear 47 which is secured to sleeve 48, sleeve 48 being journaled across frame members 14 and 15. Sleeve 48 is secured to clutch-brake assembly 50. As is apparent in the drawings, sleeve 48 is coupled to clutch member 52 in clutch-brake assembly 50. The core 54 in clutch-brake assembly 50 is secured to one end of the draw roll drive shaft 55. Brake 56 in clutch-brake assembly 50 is adapted to hold the draw roll shaft stationary until clutch 52 is energized, whereupon the draw roll 60 will rotate with driver 30.

Draw roll 60 is the output shaft of the structure, and is suitably journaled in bearings within frame members 12 and 13, and is arranged in parallel relationship with a mating roll 61 disposed immediately thereabove. Roll 61, is of course, journaled in axial parallel relationship or alignment with roll 60, and is preferably slidably mounted at each side of the apparatus in uprights 12 and 13. Means are provided for permitting upper roll 61 to be disposed in pressure engagement with the draw roll or output shaft 60.

Figure 5:
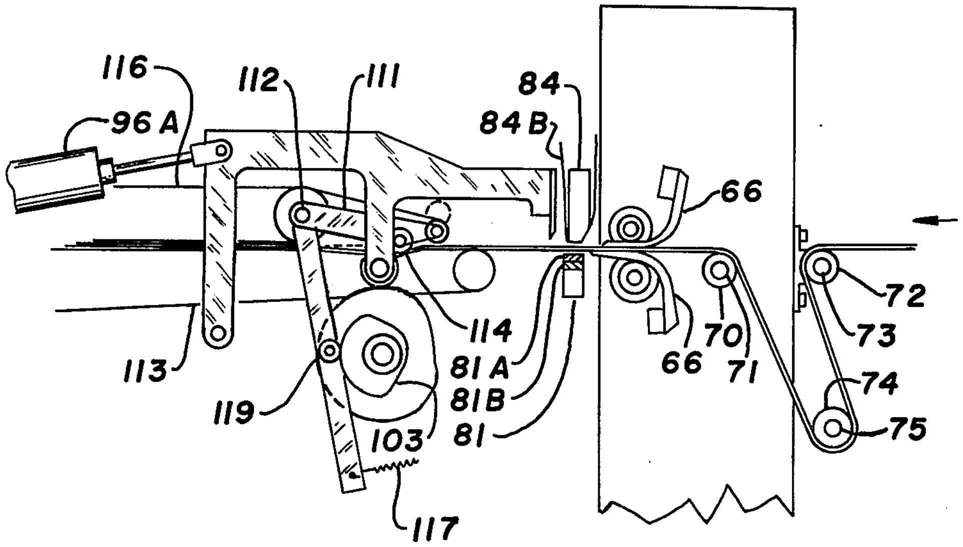
FIG. 5 is a partial detail elevational view on an enlarged scale, partially broken away, and illustrating certain components of the apparatus of FIG. 1.

It is preferable that a resilient sleeve surround each of the shafts 60 and 61, as shown in FIG. 2, such as the resilient sleeves 62 and 63. These resilient sleeves are preferably provided with a series of axially spaced circumferential slots such as the slotted area 65, each slot being adapted to retain a finger element 66 as shown in FIG. 5. The fingers each preferably terminate in a forwardly bent portion to prevent web material from clinging to the drive or draw rolls and becoming wrapped therearound.

Another axial aligned roll 70 lies in parallel to rollers 60 and 61, as shown in FIG. 5, and is also rotatably journaled for rotation on shaft 71 across frame elements 12 and 13 to permit independent rotation thereof. A further roll assembly 72 is journaled on shaft 73 which is on substantially the same plane as shaft 71, and is provided with means journalling the shaft for rotation within frame members 12 and 13. A synchronizing roll assembly 74 is also provided and arranged in axial alignment with the other roll assemblies. Shaft 74 is mounted for rotation within a pair of spaced blocks 75—75, these spaced blocks being threadedly mounted on vertical screw rod 76 which is mounted for rotation between spaced brackets at the upper portion of each of posts 12 and 13. Handle element 77 is used to control the motion of screw rod 76, and if desired, a worm drive arrangement as shown at 78 and 79 may be used to drivably interconnect a pair of oppositely disposed screw rods 76. The details of this structure are discussed in U.S. Pat. No. 2,947,345 referred to hereinabove.

Also in alignment with draw rolls 60 and 61 is a sealing pad 81 having a surface which is tough and resistant to heat as at 82. Surface 82 is preferably polytetrafluoroethylene (Teflon) or other suitable heat-resistant material on top of silicone rubber and sponge rubber pads 81A and 81B. Surface 82 is substantially along the horizontal plane of the nip of draw rolls 60 and 61, with web 83 being arranged to pass thereover. Pad 81 is preferably adjustably mounted in order to permit vertical adjustment.

Sealing bar 84 is arranged to make contact with web 83 when interposed between the heated bar 84 and pad surface 82, the surface being glass cloth 84B (FIG. 5).

Immediately adjacent bar 84 and pad 82 is cutter blade assembly generally designated 90 and including a body member 91 which is pivotally mounted for motion about mounting shaft 92. Leg 93 extends between mounting shaft 92 and the upper portion of the body 91, while leg 94 extends in parallel relationship thereto, and carries cam follower 95 at the base thereof. Cam follower 95 is arranged to ride upon cam surface 96, as indicated in FIG. 1. Air cylinder 96A is utilized to provide a bias in the cutter assembly, and is utilized to normally urge the cam follower 95 into contact with cam 96, such as, for example, in the counter-clockwise direction as viewed in FIG. 1. When desired, pressure may be provided to counter-balance any forces on the assembly to lift the cutter mechanism entirely out of the operational mode. Cutter blade 97 is disposed forwardly in body 91, blade 97 having a cutting edge at the base and being arranged to pass adjacent surface 82. As is apparent in the drawings, cam 99 contacts cam follower 100, cam follower 100 being secured to push rod 100A which is appropriately coupled to the support frame which raises and lowers bar 84 in synchronism with the motion of cutter 90. Connecting linkage such as chain 101 is utilized to transmit the motion from the shaft of cam 99 to the shaft carrying cams 96 and 103.

Forwardly of the sealing and cutting assemblies is an endless delivery belt assembly generally designated 105 which is trained about rollers 106 and 107 to pick off sealed and cut articles from pad 81 as shown in FIG. 1. These finished articles are collected in a conventional fashion, such as in collection rack 110. A rocking frame 111, as shown in FIG. 5, is pivotally mounted at 112 just above the upper span of belt 113, and carries pick-off roller 114 normally biased out of contact with belt 113, but depressible at the termination of sealing and cooling of an article so as to pull it away from pad 81 and cause it to travel on the upper span of belt 113, and beneath the lower span of belt 116. Frame 111 is biased upwardly by means of spring 117 and is caused to lower roller 114 into contact with the work upon motion induced by cam 103 in contact with cam follower 119. The pick-off mechanism is actuated during the draw cycle and during the cutting cycle, in order to assist in moving the leading edge of the bag along the conveyor structure, and in order to maintain tension during cutting. As is indicated in FIG. 1, when the articles reach the end of the nip between belts 113 and 116, the individual articles are stacked in receiver 110.

If desired, the web advance may be controlled by an electric eye control system similar to that described in detail in U.S. Pat. No. 2,947,345, and also in other forms well-known in the art. In this event, however, the termination of coupling of driver 30 through clutch-brake assembly 50 will control the ultimate length of draw, with the initiation of the draw cycle being determined by driver 30.

CUTTING AND SEALING OPERATION

In order to properly cut and seal the web 83, a single straight hot seal bar 84 having a sealing surface as at 84A overlies the surface 82 of pad 81, and is normally maintained in spaced relationship, while being adapted to be depressed into contact with web 83 after web 83 has been advanced to its proper position on pad 81. Bar 84 is heated to a constant temperature through electric leads, not shown, from a controlled source of energy, preferably electrical. Sealing bar 84 preferably has a lattice frame mounting so as to avoid accumulation of heat or the development of unevenly heated areas along the length of member 84. Sealing bar 84 is caused to slide vertically with respect to frame elements 12 and 13 and in guided relation therewith. The manner in which blade 84 is secured to the assembly is identical to the manner in which this feature is accomplished in U.S. Pat. No. 2,947,345. Specifically, the frame structure supporting blade 84 is eccentrically mounted at the side of the apparatus to pivot block 120, pivot block 120, in turn, being secured to a shaft 121, as shown in FIG. 4. A handle 122 is secured forwardly on each of the pivot blocks 120 so that, when either handle 122 is raised, sealing bar 84 will be kept upwardly in spaced relationship to pad 81 at all times. Shaft 121 is rotatably mounted adjacent each end in arm 124, the latter being pivotally suspended at 125 from a link 126, in turn pivotally mounted at a fixed position 127 at corresponding sides of the frame elements 12 and 13. On each of the arms 124 between the pivot points 121 and 125, is pivotally secured at 128 a depending yoke 129 which, in turn, rides loosely upon an eccentric 130, as shown in FIG. 4. Eccentrics 130 are secured in the same relative position to a shaft 131 which extends across the frame elements 12 and 13 and operates simultaneously. A crank arm 132 is secured to shaft 131 so that, whenever the crank 132 is moved counter-clockwise for a short distance, the yoke 129 will be permitted to lower at each position and will permit the bar 84 to descend toward pad 81. If the handles 122 are in lower position, sealing bar 84 will actually contact surface 82 of pad 81 and press thereagainst with its own weight suspended thereon. Bearing pressure will then be removed from each of the yokes 129 at its corresponding eccentric 130. In practice, a small clearance such as 1/16th inch is sufficient to permit the sealing bar 84 to rest its weight upon pad 81 without being forced downwardly thereagainst.

The crank 132 is actuated by a piston rod 133 which is pivotally connected thereto at 134. The piston rod 133, in turn, is connected to a piston 135 which is slidably received within the hydraulic cylinder 136. A compression spring 137 biases the piston 135 normally rearwardly so as to maintain crank 132 rearward and sealing bar 84 in raised position. Cylinder 136 is rigidly mounted to a bracket 138 which, in turn, is secured to frame elements 12 and 13. A hydraulic inlet tube 139 communicates with the rear end of cylinder 136 for causing the piston to move forwardly against compression spring 137. Upon release of pressure, the spring 137 will cause the piston to return and force fluid outwardly through the tube 139. An adjustable abutment screw 140 is threadedly mounted in the rear end 141 of cylinder 136 and has a thumb nut 142 at the outer end thereof for adjusting the abutment stop 143, which, in turn, determines the rearmost position of piston 135 under biasing influence of compression spring 137. Another nut 144 has an annular groove 145 which is adapted to slidably receive a yoke 146 as shown in FIG. 4. The yoke 146 extends forwardly in bracketed sliding engagement with cylinder 136 and has mounted thereon a switch 147 which is operated by an actuator 148 having a bifurcated forward end 149 and normally biased forwardly by compression spring 150. Crank arm 132 carries a pin 151 which is received in the bifurcated portion 149 of the switch actuator 148. When the arm 132 and piston 135 are biased rearwardly, the switch 147 will establish one circuit while, when moved forwardly under the pressure of hydraulic fluid in line 139, will establish another circuit, as will be described in detail under the operation of the machine.

ELECTRICAL CIRCUIT IN OPERATION

Figure 6:
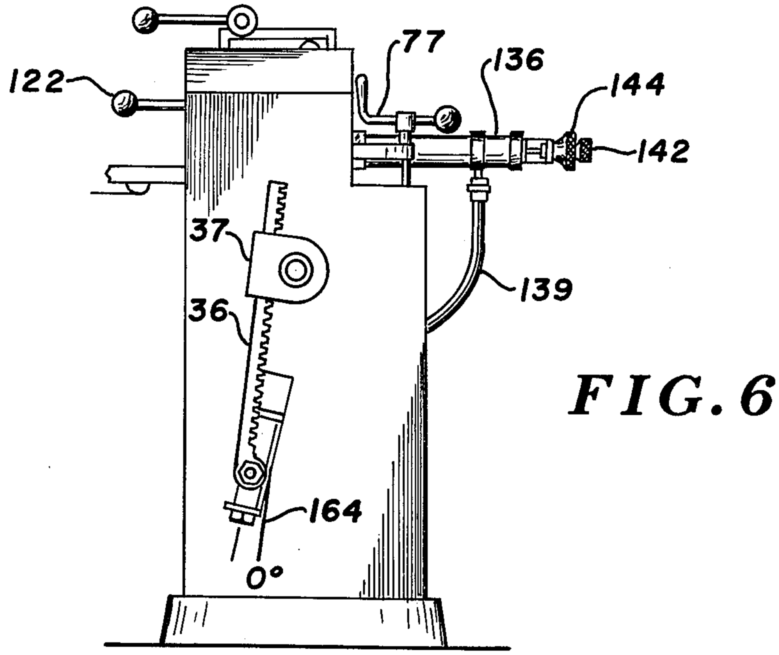
FIG. 6 is a view similar to FIG. 4, but at a slightly reduced scale, and illustrating the adjustment of the rack and pinion drive to accomplish a reversal of direction for web draw during the initial portion of the draw cycle.

In order to establish a bottom-seal operation and cut-off for the preparation of bags or other elongated structures from the web 83, the web is initially positioned on the roll system, with the folded web being advanced by the output shaft operating the draw rolls 60 and 61. The seal bar 84 will be maintained at a constant temperature suitable for cutting and welding the particular thermoplastic web in the desired thickness. The main drive motor 20 is constantly energized and rotates the input shaft 29 through gears 27 and 28 whenever the clutch-brake assembly 23 is energized, it being understood that no rotation is imparted to input shaft 29 when clutch 25 is de-energized and brake 26 is energized. Cams 160, 161, 162, and 163 are all fixed to, and rotate with shaft 29 to establish the sequence of operation. An operational cycle of the apparatus includes one complete rotation of input shaft 29 beginning with the individual crank arm 33 in alignment with gear rack 36. Such a disposition is illustrated at the alignment marker indicated "0" shown at 164 in FIG. 6. Thus, the position illustrated in FIG. 4 is subsequent to this point in the cycle, with the crank arm 33 having progressed an arcuate distance from the starting point. With attention being directed to FIGS. 3, 4 and 6 of the drawings, it will be observed that the initial motion of the web is in the reverse direction, with the direction changing at "0"° in the operational cycle, and with that rate of motion of the web increasing until a peak or top speed is reached at 90° of the motion of the input shaft 29, and thereafter the rate decreases sinusoidally until 180° of motion has been achieved. At that point, clutch 52 is de-energized and draw roll 60 ceases rotation. The next 180° of rotation of the input shaft are utilized for dwell, during which time the cutting and sealing operations will occur. With this arrangement, long bag structures, up to 36 inches or more in length, may be fabricated at rapid machine rates.

Cam wheel 160 controls the clutch-brake system 23, and cam wheel 163 controls the clutch-brake system 50 which, in turn, drive the output shaft or draw roll 60. Cam wheel 161 initiates the cutting and sealing movement for cutter 90 and sealing bar 84 and the timing cycle which determines the dwell period thereof. Cam wheel 162 is utilized to control the operation of an electric eye in the system, when utilized for controlling the web draw.

The operation of the circuitry is set forth in detail in U.S. Pat. No. 2,947,345, and reference is made to that disclosure for the details of operation of the present structure, it being understood that the arrangement is for a single web in the present structure rather than the dual web as discussed in U.S. Pat. No. 2,947,345.

It will be appreciated, also, that the operation of cam wheels 160 and 163 is closely coordinated and controlled in order that the sequential actuation occurs on a substantially simultaneous basis, thus eliminating any tendency for the film to be abruptly jerked in its draw cycle.

In a typical operational mode, the reversal will normally correspond to about 5° of machine motion, and is adapted to cause reversal in an equivalent of between about ⅛th inch and ¼th inch. It is this back-up feature which will free the web 83 from sealing contact with surface 82 of pad 81. This extent of reversal has been found to be adequate for most operations, although some film characteristics may require reverse draws outside of these limits.

Figure 7:
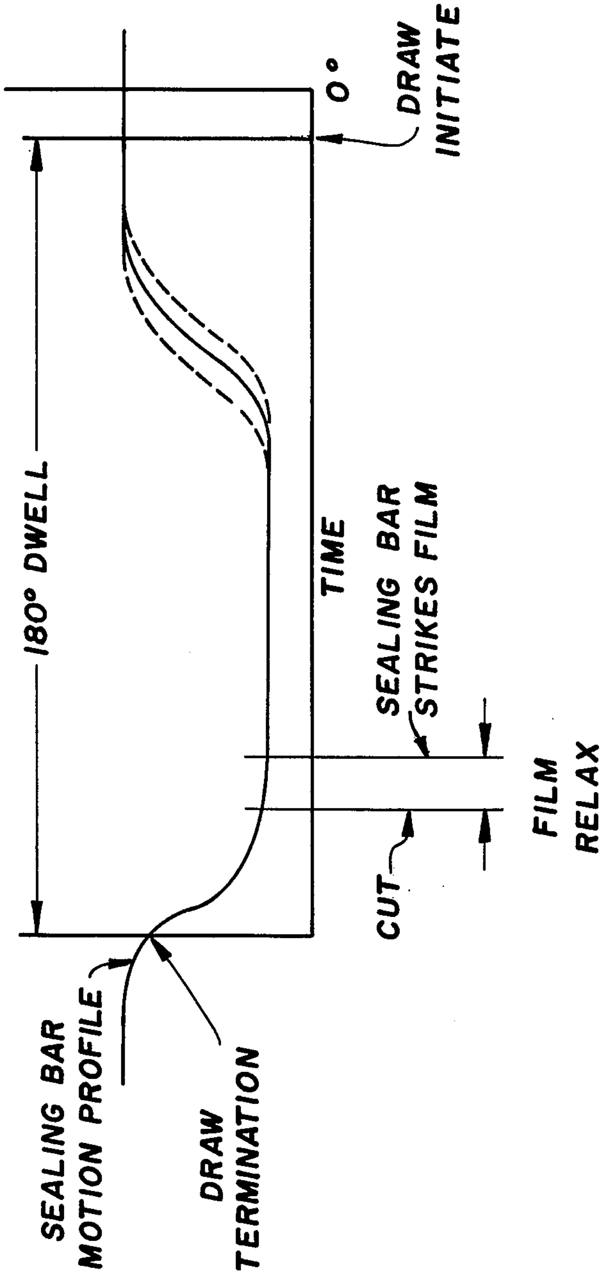
FIG. 7 is a plot of the sealing bar motion profile relative to machine time.

The timing of the system is further arranged to accommodate the web with appropriate periods of tension and slack. Therefore, starting with the draw cycle, a bag bottom will be defined at the sheared portion, as cut by blade 97, with the sealed area being disposed immediately adjacent thereto. The edge of the bag, defined by the cut or sheared portion, moves under the influence of pick-off member 111, into the area defined by the conveyor belts 113 and 116. Modest tension is applied to the bag at this time, particularly in view of the depression area formed in the web, as illustrated in FIG. 5 immediately adjacent pick-off roller member 114. Upon achieving dwell, the motion of continuous running conveyor members 113 and 116 will maintain the bag gripped therebetween in taut relationship and the first operation to occur is the shearing of the web by blade 97. The bag structure which is disposed in the conveyor section at this time has its upper surface defined by the cut or severed section, as cut by blade 97. Immediately subsequent to the severing of the film, a finite period of time for web relaxation is provided, after which sealing bar 84 makes contact with the web across surface 82 of pad 81. For most purposes, and in most applications, a web relaxation time of between about 40 and 50 milliseconds is adequate, this being accomplished by controlling the lag between cutting and sealing. Sealing is achieved in the sealing dwell illustrated in FIGS. 3 and 7, with approximately 30° of the dwell time being devoted to the actual sealing operation. For most applications, a sealing bar heated to a temperature of between 375° F. and 400° F. is adequate. With greater film thickness, that is, films in excess of 1½ or 2 mils, the seal pad may be heated correspondingly.

Figure 3:
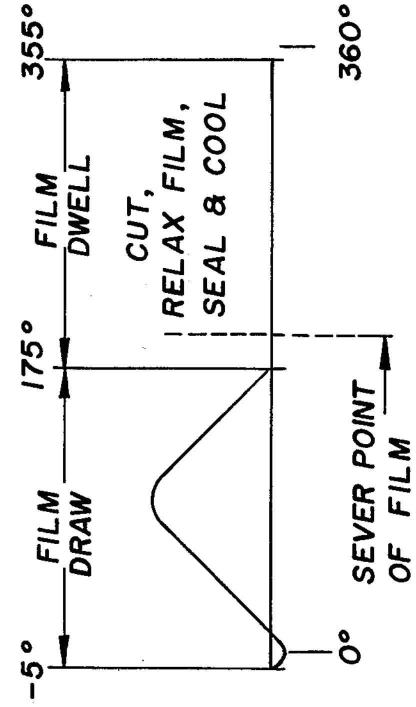
FIG. 3 is a plot illustrating the major machine functions during a typical operational cycle, and illustrating the reversible characteristic of the web draw.

The graph of FIG. 3 has been found to be typical for 80 cycles per minute, and thus adequate time is permitted for the seal to cool or set prior to the actuation of the draw rolls. When the apparatus reaches 355° of machine motion, or essentially the position illustrated in FIG. 6, the draw-roll portion of the system is again actuated and the draw rolls initiate their reverse motion. The reversal of motion is adequate to move the web approximately ⅛th inch and break loose any bond which may exist between the web 83 and the sealing surface 82 of pad 81.

With attention being directed to FIGS. 1 and 5 of the drawings, it will be appreciated that air cylinder 96A may be utilized to retract blade assembly 90 for inspection, or any other useful purpose. Blade 97 may be either straight or serrated at its cutting surface, with the serrated blade being desired for purposes of performing and forming straight cuts. It will be further observed that the cutting knife is elevated out of the path of web 83 during the draw cycle. The structure accordingly makes it possible to service the mechanism without stopping, this being particularly advantageous in an in-line apparatus coupled directly to an extruder. Also, if desired, the cutting blade may be coated with polytetrafluoroethylene (Teflon) with a heated blade being utilized when required.

The cut is performed at a point reasonably close to the location of the seal, this being particularly important for purposes of film economy. Therefore, the bag styles formed are desirable from the standpoint of economy and also aesthetically.

It will be further observed that the tension built up in the bag prior to cutting is appropriate for the system, and is constant during the cutting operation. Since the pick-off mechanism functions on a belt-to-belt basis, problems such as belt stretching and the like are normally avoided. For most purposes, the conveyor is run at a rate which is approximately two times the rate of draw, with the rate of draw exceeding the conveyor speed only during the peak draw rate. While modest wrinkles may form in the finished product, they are smoothed off when the pick-off member strikes and the draw rate is retarded. The pick-off remains in contact until after the bag has been extracted from the cutting area.

The mechanism makes it possible to cut the film on occasions of tension, and to seal on a relaxed slack film. The back-up feature permits any bonding to be disrupted which may have occurred during the cooling or setting portion of the cycle. It has been found that uniform seals with firm and strong characteristics are provided and formed.

It will be appreciated that the various times and temperatures set forth are typical of certain operational modes. It is possible therefore, to utilize lower seal bar temperatures with longer seal dwell times and satisfactory seals are still obtained. In one typical operation, it has been found that 1½ mil polyethylene may be sealed with a sealing bar having a temperature of 400° F., however the seal bar dwell time is about 90° of an 80 cycle per minute rate. It is preferred, however, to utilize a relatively short sealing time in order to permit the seal to set prior to introducing motion in the web. With between about 30° and 120° of seal bar dwell being available, it should be possible to provide seals for a variety of films and requirements.

In order to accomplish substantial "relaxation" of the film, and otherwise relieve any stresses that may be present in the film, due to its resilient characteristic, a typical dwell period of approximately 15° to about 20° of machine rotation is adequate. Therefore, this time may be pre-set in the apparatus for accomplishing relaxation under most normal conditions.

The film parameters involved in determining the magnitude of the stress include the draw length, for example, of the bag length, the gauge of the film, along with the width of the web. Longer "relaxation" times are needed for longer draws, as well as for lighter gauge materials, while increasing the width of the web tends to decrease the relaxation time requirement. As has been indicated, however, for normal applications the relaxation dwell time of between 15° and 20° has been found appropriate.

Either thermoplastic tubing or superimposed webs may be employed to form the web 83. However, it will be appreciated that for most purposes, the material reaching the sealing and cutting stations will be in the form of open-ended tubing. Polyethylene is the preferred thermoplastic material, however other heat-sealable films may be utilized as deemed appropriate, such as, for example, polypropylene or the like.

I claim:

1. Thermoplastic web treating apparatus comprising, in combination, drive means for intermittently advancing superimposed webs of thermoplastic sheet film material along a certain predetermined plane of travel and for stopping said superimposed webs for a predetermined period of dwell, hot knife means for thermally welding said superimposed webs together at predetermined spaced intervals therealong, and blade means for severing said superimposed webs at predetermined spaced intervals therealong; said apparatus comprising:

(a) drive means including draw roll means in driving contact with said webs for imparting repeating cycles of intermittent motion and dwell to said web with the motion being reversible between motion in the forward web direction and motion in the reverse web direction;

(b) said severing blade means including a knife having a cutting blade secured thereto and knife actuating means for reciprocatorily moving said cutting blade through the plane of travel of said web to sever said web;

(c) hot knife means including a heated welding bar and a back-up pad therefor, actuating means for reciprocatorily moving said heated welding bar to bring said welding bar into contact with said superimposed webs against said back-up pad for a predetermined period of time for welding portions of said superimposed webs together;

(d) control means for determining the draw and dwell cycles of said drive means and for controlling the period of operation of said severing blade means and said welding bar;

(e) said severing blade means and welding bar means being arranged to cut and weld said film during web dwell with the cutting operation of said blade preceding the welding operation for severing said film prior to welding, said control means being arranged to actuate said draw rolls in a draw cycle which includes two directions of motion of web draw with an initial period of motion in the draw rolls being in the reverse web direction to release said web from the surface of said back-up pad, and a second period of motion in the forward web direction to advance said superimposed webs preparatory to the next succeeding period of dwell; and (f) means are provided for biasing said cutting blade toward said film in a first operational mode and for retracting said cutting blade away from said film in a second operational mode.

2. The thermoplastic web treating apparatus as defined in claim 1 being particularly characterized in that said operational cycle includes a finite period of time for continued web dwell following said cutting operation and prior to the establishing of contact between said welding bar means and said film for relieving of stresses in said film.

* * * * *